US012709162B2

(12) United States Patent
Yasuda et al.

(10) Patent No.: US 12,709,162 B2
(45) Date of Patent: Aug. 18, 2026

(54) CONTROL SYSTEM FOR ELECTRIFIED VEHICLE

(71) Applicants: TOYOTA JIDOSHA KABUSHIKI KAISHA, Toyota (JP); DENSO CORPORATION, Kariya-city (JP)

(72) Inventors: Satoshi Yasuda, Nagakute (JP); Taro Shimosaka, Seto (JP)

(73) Assignees: TOYOTA JIDOSHA KABUSHIKI KAISHA, Toyota (JP); DENSO CORPORATION, Kariya-City (JP)

( * ) Notice: Subject to any disclaimer, the term of this patent is extended or adjusted under 35 U.S.C. 154(b) by 81 days.

(21) Appl. No.: 18/971,435

(22) Filed: Dec. 6, 2024

(65) Prior Publication Data

US 2025/0229641 A1 Jul. 17, 2025

(30) Foreign Application Priority Data

Jan. 12, 2024 (JP) ................................ 2024-003544

(51) Int. Cl.
*B60L 15/20* (2006.01)
*B60L 3/00* (2019.01)
*B60R 16/023* (2006.01)

(52) U.S. Cl.
CPC ............. *B60L 15/20* (2013.01); *B60L 3/0084* (2013.01); *B60R 16/0231* (2013.01); *B60L 2240/423* (2013.01); *B60L 2260/26* (2013.01)

(58) Field of Classification Search
None
See application file for complete search history.

(56) References Cited

U.S. PATENT DOCUMENTS

2017/0288951 A1* 10/2017 Kurauchi ............ H04L 43/0811
2018/0170362 A1* 6/2018 Choi ...................... B60K 6/485
2020/0372729 A1* 11/2020 Duan ....................... G07C 5/08
2021/0006195 A1* 1/2021 Maeda .................... B60L 15/20
(Continued)

FOREIGN PATENT DOCUMENTS

JP 2015201978 A * 11/2015 ................ B60L 3/00
JP 2020-62930 A 4/2020
KR 102212791 B1 * 2/2021 ............ B60W 20/50

OTHER PUBLICATIONS

English translation of KR102212791B1, retrieved from Espacenet on Apr. 13, 2026 (Year: 2026).*

*Primary Examiner* — Amelia Vorce
(74) *Attorney, Agent, or Firm* — Sughrue Mion, PLLC

(57) ABSTRACT

A control system in the present specification includes: an electric power control device; a first control device; and a second control device. The second control device includes a processor and a logic circuit. In a case where a limp home mode is executed, the first control device outputs a second command value to the logic circuit. The logic circuit includes a first circuit structure, a second circuit structure, a third circuit structure that receives a driving signal resulting from conversion by the first circuit structure and a limp home driving signal resulting from conversion by the second circuit structure, and alternatively outputs one of them, and a fourth circuit structure that receives the output made by the third circuit structure and a cutoff command for the electric power control device, and cuts off the output made by the third circuit structure while receiving the cutoff command.

5 Claims, 2 Drawing Sheets

(56) References Cited

U.S. PATENT DOCUMENTS

2022/0410718 A1* 12/2022 Xu .......................... B60L 3/0061
2024/0025271 A1* 1/2024 Alvi ..................... B60L 15/2045
2025/0206302 A1* 6/2025 Jin ..................... B60W 50/0098

* cited by examiner 2
6
4
20
40
48
46
30
42
44
10

CONTROL SYSTEM FOR ELECTRIFIED VEHICLE

CROSS-REFERENCE TO RELATED APPLICATION

This application claims priority to Japanese Patent Application No. 2024-003544 filed on Jan. 12, 2024, incorporated herein by reference in its entirety.

BACKGROUND

1. Technical Field

The technology disclosed in the present specification relates to a control system for an electrified vehicle.

2. Description of Related Art

Japanese Unexamined Patent Application Publication No. 2020-062930 discloses an electrified vehicle. This electrified vehicle is a hybrid electric vehicle and includes a control system that controls two motors. It is to be noted that the term "electrified vehicle" used in the present specification widely means a vehicle equipped with a traction motor that drives a wheel. For example, the electrified vehicle includes a battery electrified vehicle, a fuel cell electric vehicle, a plug-in hybrid electric vehicle, and the like in addition to the hybrid electric vehicle.

SUMMARY

This type of control system includes a plurality of control devices in many cases. For example, the control system may include a first control device that determines a target output (i.e., torque command value) of a motor and a second control device that outputs an operation command value to an electric power control device such as an inverter in response to the torque command value from the first control device. In this case, the first control device and the second control device are configured to be communicable with each other and cooperate with each other in controlling the motors.

In the control system, in a case where the second control device has a fault, it is not possible to control the motors even though the first control device is healthy. However, the fault in the second control device is a fault in some of the components of the second control device and the other components of the second control device are still usable in many cases. In such a case, it is conceivable to control the motors by using the other usable components of the second control device to cause the electrified vehicle to limp home.

In addition, to cause the electrified vehicle to safely travel, a configuration is conceivable in which a cutoff command that cuts off an operation command for the electric power control device is output in the control system, for example, in a situation (e.g., an abnormality of a sensor value or the like) in which the electrified vehicle is not to travel. In the control system, the cutoff command is output, for example, from the first control device to the second control device. While the cutoff command is being output, an operation command value from the second control device is cut off even though a torque command value is output based on an instruction of a user or the like. This stops the operation of the electric power control device. To cause the electrified vehicle to safely travel, it is important to appropriately cut off the operation command value while the second control device is receiving a cutoff command.

A configuration is therefore conceivable in which cutoff confirmation as to whether or not the operation command value of the second control device is cut off is obtained while the cutoff command is being output. In particular, a configuration is conceivable in which cutoff confirmation is independently obtained in a normal traveling mode and a limp home mode. When the normal traveling mode transitions to the limp home mode in such a situation, cutoff confirmation may be obtained at that timing. In this case, it may take a relatively long time to transition from the normal traveling mode to the limp home mode. The present specification provides technology that allows for smooth transition to the limp home mode.

The present specification discloses a control system for an electrified vehicle. According to a first aspect, the control system includes: an electric power control device; a first control device; and a second control device. The electric power control device adjusts electric power to be supplied to a motor of the electrified vehicle. The first control device outputs a first command value indicating a target output of the motor. The second control device is configured to be communicable with the first control device. The second control device outputs a driving signal to the electric power control device based on the first command value output from the first control device. The second control device includes a processor, and a logic circuit. The processor is configured to be communicable with the first control device. The processor programmatically processes the first command value output from the first control device. The processor outputs an operation command value for the motor. The logic circuit includes a first circuit structure that converts the operation command value output from the processor to the driving signal. In a case where a limp home mode that causes the electrified vehicle to limp home is executed, the first control device outputs a second command value based on the limp home mode to the logic circuit instead of the first command value. The logic circuit further includes a second circuit structure, a third circuit structure, and a fourth circuit structure. The second circuit structure converts the second command value output from the first control device to a limp home driving signal. The third circuit structure receives the driving signal resulting from the conversion by the first circuit structure and the limp home driving signal resulting from the conversion by the second circuit structure, and alternatively outputs one of the driving signals. The fourth circuit structure receives the output made by the third circuit structure and a cutoff command for the electric power control device, and cuts off the output made by the third circuit structure while receiving the cutoff command.

According to the configuration, the logic circuit includes the third circuit structure that receives the driving signal resulting from the conversion by the first circuit structure and the limp home driving signal resulting from the conversion by the second circuit structure, and alternatively outputs one of them, and a fourth circuit structure that receives the output made by the third circuit structure and the cutoff command for the electric power control device, and cuts off the output made by the third circuit structure while receiving the cutoff command. That is, the fourth circuit structure is commonly provided for the driving signal resulting from the conversion by the first circuit structure and the driving signal resulting from the conversion by the second circuit structure. Thus, in a case where the limp home mode is executed, it is possible to transition to the limp home mode without confirming the health of the fourth circuit structure. That is, smooth transition to the limp home mode is possible.

According to a second aspect, the cutoff command may be output from the first control device to the logic circuit in the first aspect.

According to a third aspect, in a case where the electrified vehicle is powered on, the first control device may execute processing of confirming the health of the fourth circuit structure in the first or second aspect by outputting the first command value or the second command value to the second control device and outputting the cutoff command to the logic circuit, and confirming that the output made by the third circuit structure is cut off. According to the configuration, it is possible for the first control device to confirm the health of the fourth circuit structure in advance in a case where the electrified vehicle is powered on.

According to a fourth aspect, in a case where the first control device detects a fault in the processor, the first control device may execute the limp home mode in any one of the first to third aspects.

According to a fifth aspect, in a case where the electrified vehicle is powered on and a fault in the processor is detected, the first control device may execute processing of confirming the health of the fourth circuit structure in any one of the first to fourth aspects by outputting the second command value to the logic circuit and outputting the cutoff command to the logic circuit, and confirming that the output made by the third circuit structure is cut off. According to the configuration, it is possible for the first control device to confirm the health of the fourth circuit structure in advance in a case where the electrified vehicle is powered on.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
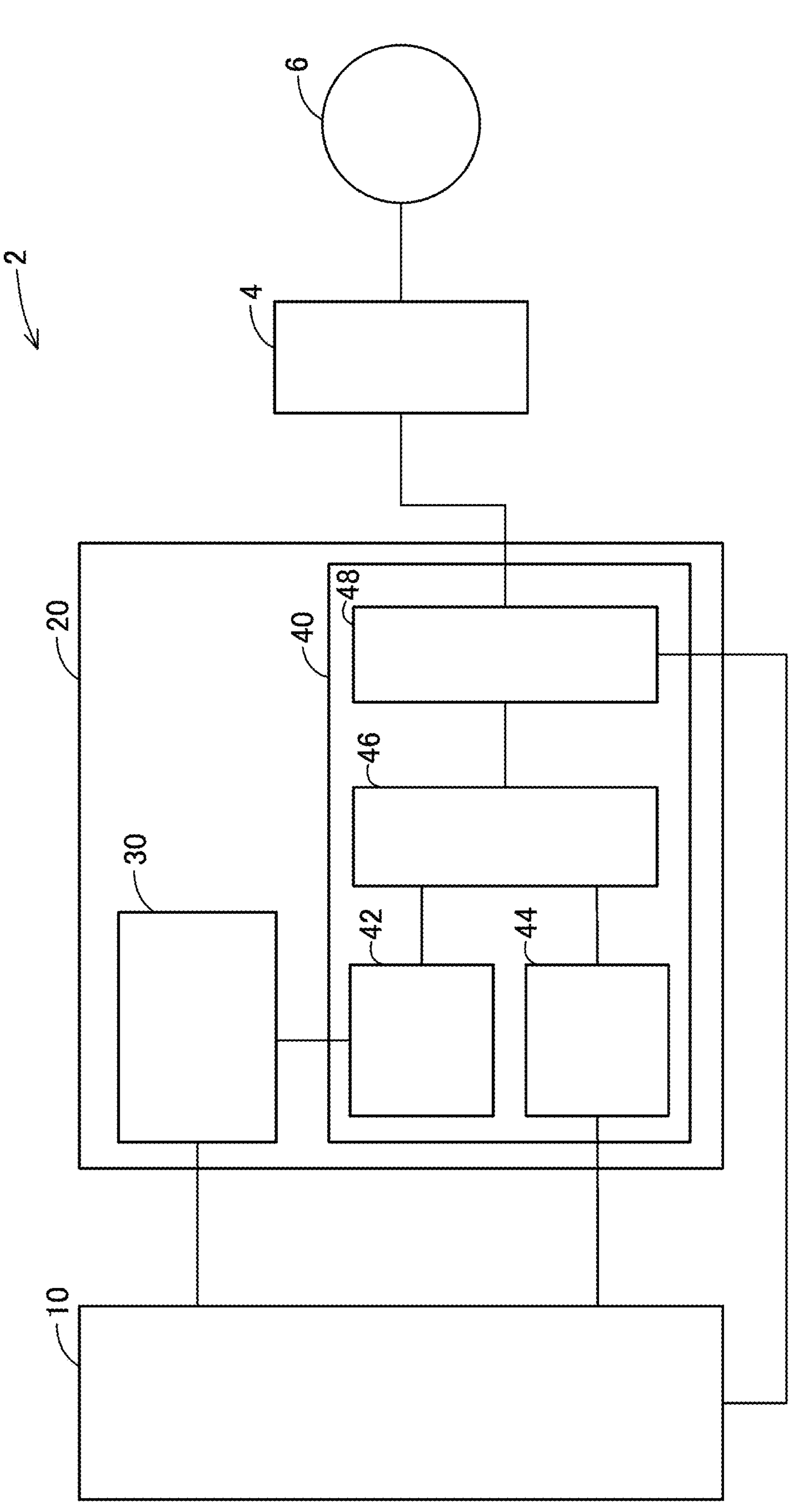
FIG. 1 is a schematic diagram of a circuit configuration of a control system.

Circuit Configuration of Control System 2; FIG. 1

A control system 2 according to the present embodiment is mounted on an electrified vehicle (e.g., a battery electrified vehicle, a hybrid electric vehicle, a fuel cell electric vehicle, a plug-in hybrid electric vehicle, and the like) equipped with a traction motor that drives a wheel. As illustrated in FIG. 1, the control system 2 includes an inverter 4, a motor 6, an upper-level electronic control unit (ECU) 10, and a motor ECU 20.

The inverter 4 converts direct-current electric power output from an unillustrated battery to three-phase alternating-current electric power and supplies the three-phase alternating-current electric power to the motor 6. That is, the inverter 4 is a device that adjusts electric power to be supplied to the motor 6. The motor 6 is driven to allow the electrified vehicle to travel. Additionally, it is also possible for the inverter 4 to convert regenerated electric power (three-phase alternating-current electric power) of the motor 6 to direct-current electric power and supply the direct-current electric power to the unillustrated battery. A specific circuit configuration of the inverter 4 has been known well and detailed description thereof will be omitted.

The upper-level ECU 10 outputs a torque command value indicating a target output of the motor 6, for example, based on an accelerator operation amount or the like. The motor ECU 20 is configured to be communicable with the upper-level ECU 10. The motor ECU 20 outputs a driving signal to the inverter 4 based on the torque command value output from the upper-level ECU 10. More specifically, in a case where a normal traveling mode that causes the electrified vehicle to normally travel is executed, the upper-level ECU 10 outputs a normal traveling torque command value to a microcontroller 30 of the motor ECU 20. In addition, in a case where a limp home mode that causes the electrified vehicle to limp home is executed, the upper-level ECU 10 outputs a limp home torque command value to an ASIC 40 of the motor ECU 20. In addition, the upper-level ECU 10 is configured to be capable of outputting a cutoff command for the inverter 4 to the ASIC 40.

The motor ECU 20 includes the microcontroller 30 and the application specific integrated circuit (ASIC) 40. The microcontroller 30 is configured to be communicable with the upper-level ECU 10. The microcontroller 30 programmatically processes the normal traveling torque command value output from the upper-level ECU 10 and outputs a current command value for the motor 6. The microcontroller 30 includes, for example, a central processing unit (CPU). It is possible for the microcontroller 30 to programmatically process the normal traveling torque command value output from the upper-level ECU 10 by the CPU.

The ASIC 40 is configured to be communicable with the upper-level ECU 10 and the microcontroller 30. In particular, the ASIC 40 is configured to be communicable with the upper-level ECU 10 without going through the microcontroller 30.

The ASIC 40 includes a circuit structure that controls the motor 6. For example, the ASIC 40 includes some or all of the hardware portions specialized in motor control such as a resolver digital converter, an analog-to-digital converter, and a motor IP. More specifically, the ASIC 40 includes a first circuit structure 42, a second circuit structure 44, a third circuit structure 46, and a fourth circuit structure 48. In addition, although not illustrated, the ASIC 40 also includes a circuit structure that detects a fault in the microcontroller 30.

The first circuit structure 42 is a circuit that receives a current command value output from the microcontroller 30 and converts the current command value to a driving signal. The second circuit structure 44 is a circuit that receives a limp home torque command value output from the upper-level ECU 10 and converts the limp home torque command value to a driving signal.

The third circuit structure 46 is a circuit that receives the driving signal resulting from the conversion by the first circuit structure 42 and the driving signal resulting from the conversion by the second circuit structure 44, and alternatively outputs one of the driving signals. The third circuit structure 46 is configured to receive, for example, from the circuit structure that detects a fault in the microcontroller 30, an input indicating whether or not the microcontroller 30 is at fault, and output the driving signal resulting from the conversion by the first circuit structure 42 in a case where the microcontroller 30 is not at fault and output the driving signal resulting from the conversion by the second circuit structure 44 in a case where the microcontroller 30 is at fault.

The fourth circuit structure 48 is configured to receive an output made by the third circuit structure 46 and an output made by the upper-level ECU 10, and cut off the output made by the third circuit structure 46 while receiving a cutoff command. That is, while the upper-level ECU 10 is outputting a cutoff command, a driving signal for the inverter 4 is not output and the inverter 4 thus stops operating.

It is to be noted that the upper-level ECU 10 is also configured to be capable of detecting that the microcontroller 30 is at fault. For example, the upper-level ECU 10 may transmit a signal to the microcontroller 30 for each predetermined period and detect a fault in the microcontroller 30 in a case where the upper-level ECU 10 does not receive a response to the signal.

As described above, in the control system 2 according to the present embodiment, the upper-level ECU 10 and the motor ECU 20 (i.e., the microcontroller 30 and the ASIC 40) cooperate with each other in controlling the inverter 4. Specifically, the upper-level ECU 10 first outputs, to the microcontroller 30, a torque command value that is a target output of the motor 6 based on an accelerator operation amount and the like. The microcontroller 30 programmatically processes the torque command value and outputs a current command value for the motor 6 to the ASIC 40. The ASIC 40 converts the current command value to a driving signal.

A situation will be assumed in which one or some (specifically, the microcontroller 30) of the components of the motor ECU 20 have a fault in the control system 2 like this. In such a situation, a torque command value output from the upper-level ECU 10 is not acquired by the microcontroller 30. It is not therefore possible for the ASIC 40 to acquire a current command value from the microcontroller 30 and thus output a driving signal. That is, when the microcontroller 30 is at fault in the control system 2 like this, it is not usually possible for the control system 2 to cause the electrified vehicle to travel.

Accordingly, the upper-level ECU 10 transitions to the limp home mode in the control system 2 according to the present embodiment when a fault in the microcontroller 30 is detected. In the limp home mode, the upper-level ECU 10 outputs a limp home torque command value to the second circuit structure 44 of the ASIC 40 instead of outputting a torque command value to the microcontroller 30. In addition, as described above, when the ASIC 40 detects a fault in the microcontroller 30, the third circuit structure 46 cuts off an output made by the second circuit structure 44. In this way, even when a fault in the microcontroller 30 is detected, it is possible to cause the electrified vehicle to limp home.

In particular, the ASIC 40 according to the present embodiment includes the fourth circuit structure 48 in the final stage of the ASIC 40. The fourth circuit structure 48 then alternatively receives the driving signal resulting from the conversion by the first circuit structure 42 and the driving signal resulting from the conversion by the second circuit structure 44. That is, in the configuration according to the present embodiment, the cutoff command for the inverter 4 is commonly provided to the driving signal (i.e., normal traveling driving signal) resulting from the conversion by the first circuit structure 42 and the driving signal (i.e., limp home driving signal) resulting from the conversion by the second circuit structure 44.

Here, a comparative example will be assumed in which cutoff commands for the inverter 4 are independently provided to a normal traveling signal and a limp home driving signal. In this comparative example, when an electrified vehicle in which the microcontroller 30 is not at fault is started (i.e., when the upper-level ECU 10 is started), cutoff confirmation for the normal traveling driving signal is obtained. After that, when a fault in the microcontroller 30 is detected, cutoff confirmation for the limp home driving signal is obtained. In this way, in the comparative example, cutoff confirmation for the limp home driving signal is obtained at the time of transition from the normal traveling mode to the limp home mode. If it takes time to obtain this cutoff confirmation, smooth transition from the normal traveling mode to the limp home mode is not possible. As a result, user convenience may decrease.

In contrast, in the configuration according to the present embodiment, a cutoff command for the inverter 4 is commonly provided to a normal traveling driving signal and a limp home driving signal. This makes it possible to cause the electrified vehicle to appropriately travel whether in the normal traveling mode or the limp home mode if cutoff confirmation is obtained to confirm that the fourth circuit structure 48 is healthy when the electrified vehicle is started (i.e., when the upper-level ECU 10 is started). In particular, it is not necessary to obtain cutoff confirmation again at the time of transition from the normal traveling mode to the limp home mode, allowing for smooth transition to the limp home mode. This increases user convenience.

Figure 2:
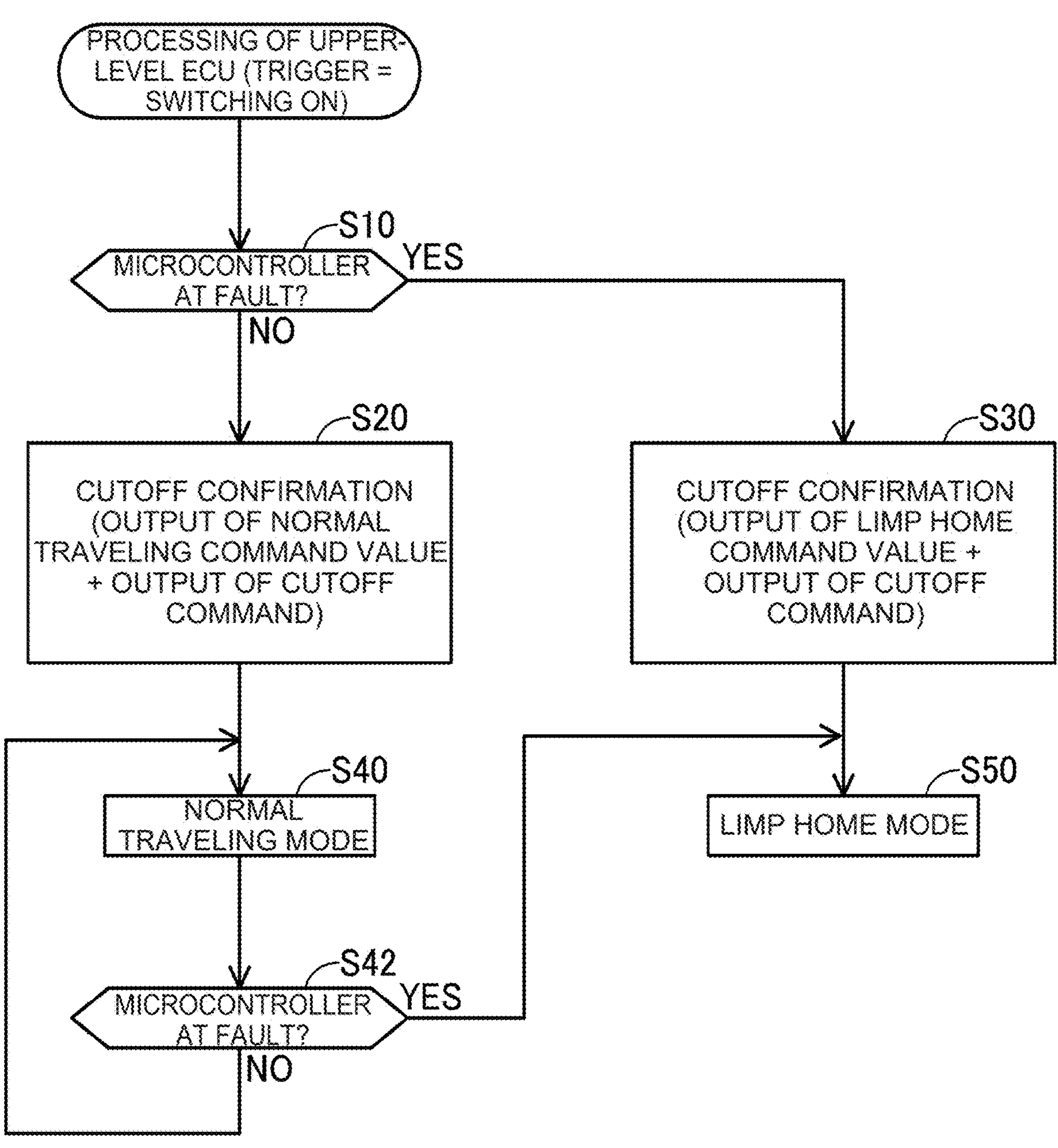
FIG. 2 is a flowchart of processing that is executed by an upper-level ECU.

Processing of Upper-Level ECU 10; FIG. 2

Subsequently, processing executed by the upper-level ECU 10 will be described with reference to FIG. 2. The processing of FIG. 2 is started by switching on the upper-level ECU 10 as a trigger in response to an electrified vehicle being switched on.

In S10 of FIG. 2, the upper-level ECU 10 determines whether or not the microcontroller 30 is at fault. For example, as described above, the upper-level ECU 10 transmits a signal to the microcontroller 30. In a case where the upper-level ECU 10 receives a response to the signal, the upper-level ECU 10 determines that the microcontroller 30 is not at fault (NO in S10) and proceeds to S20. In contrast, the upper-level ECU 10 transmits a signal to the microcontroller 30. In a case where the upper-level ECU 10 does not receive a response to the signal, the upper-level ECU 10 determines that the microcontroller 30 is at fault (YES in S10) and proceeds to S30.

In S20, the upper-level ECU 10 obtains cutoff confirmation to confirm whether or not the fourth circuit structure 48 of the ASIC 40 is healthy (i.e., whether or not it is possible to appropriately cut off an output of the third circuit structure 46 in response to a cutoff command of the upper-level ECU 10). Specifically, the upper-level ECU 10 first outputs a normal traveling torque command value to the microcontroller 30 and outputs a cutoff command to the fourth circuit structure 48. The microcontroller 30 is not at fault in S20 (NO in S10), and the microcontroller 30 thus programmatically processes the acquired torque command value and outputs a current command value to the first circuit structure 42 of the ASIC 40. The first circuit structure 42 converts the acquired current command value to a driving signal and outputs the driving signal to the third circuit structure 46. In addition, the microcontroller 30 is not at fault in S10 and the third circuit structure 46 thus outputs the driving signal resulting from the conversion by the first circuit structure 42. The fourth circuit structure 48 thus receives the driving signal resulting from the conversion by the first circuit structure 42 and the cutoff command.

As described above, the fourth circuit structure 48 cuts off an output made by the third circuit structure 46 while receiving the cutoff command. Thus, if the fourth circuit structure 48 is healthy, the output (i.e., normal traveling driving signal) of the third circuit structure 46 is cut off. The upper-level ECU 10 confirms that the normal traveling driving signal is cut off. It is to be noted that an abnormality of the fourth circuit structure 48 may cause the normal traveling driving signal not to be cut off in spite of a cutoff command input from the upper-level ECU 10. In this case, although not illustrated, the upper-level ECU 10 may determine that it is impossible to cause the electrified vehicle to travel and may switch off the electrified vehicle.

It is to be noted that the upper-level ECU 10 outputs only a normal traveling torque command value in the present embodiment, but may output a limp home torque command value to the second circuit structure 44 of the ASIC 40 in addition to or instead of the normal traveling torque command value.

In S30, the upper-level ECU 10 obtains cutoff confirmation. Specifically, the upper-level ECU 10 first outputs a limp home torque command value to the second circuit structure 44 of the ASIC 40 and outputs a cutoff command to the fourth circuit structure 48. The second circuit structure 44 converts the acquired torque command value to a limp home driving signal and outputs the limp home driving signal to the third circuit structure 46. In addition, the microcontroller 30 is at fault in S30 and the third circuit structure 46 thus outputs the limp home driving signal resulting from the conversion by the second circuit structure 44. The fourth circuit structure 48 thus receives the limp home driving signal resulting from the conversion by the second circuit structure 44 and the cutoff command. The subsequent processing is similar to the processing in S20 except that an output of the third circuit structure 46 is a limp home driving signal resulting from conversion by the second circuit structure 44.

In S40, the upper-level ECU 10 starts control in the normal traveling mode. That is, the upper-level ECU 10 starts processing of outputting a torque command value to the microcontroller 30 based on an instruction of a user such as an accelerator operation amount. The processing in S42 is similar to the processing in S10.

In S50, the upper-level ECU 10 starts control in the limp home mode. That is, the upper-level ECU 10 starts processing of outputting a limp home torque command value to the second circuit structure 44 of the ASIC 40 based on an instruction of a user such as an accelerator operation amount.

As described above, the configuration according to the present embodiment allows the upper-level ECU 10 to cause the electrified vehicle to appropriately travel whether in the normal traveling mode or the limp home mode if cutoff confirmation is obtained to confirm that the fourth circuit structure 48 is healthy when the electrified vehicle is started (i.e., when the upper-level ECU 10 is started). Thus, it is not necessary to obtain cutoff confirmation again at the time of transition from the normal traveling mode to the limp home mode, allowing for smooth transition to the limp home mode. As a result, user convenience increases.

The upper-level ECU 10 and the motor ECU 20 are examples of a "first control device" and a "second control device" according to this technology, respectively. The microcontroller 30 and the ASIC 40 are examples of a "processor" and a "logic circuit" according to this technology, respectively. The inverter 4 is an example of an "electric power control device" according to this technology. The torque command value output from the upper-level ECU 10 to the microcontroller 30 and the torque command value output from the upper-level ECU 10 to the ASIC 40 are examples of a "first command value" and a "second command value" according to this technology, respectively. The current command value output from the microcontroller 30 to the ASIC 40 is an example of an "operation command value" according to this technology.

A modification example of the embodiment will be described. The upper-level ECU 10 may omit the processing in S10 and the processing in S30. In this case, in a case where the electrified vehicle is switched on, the upper-level ECU 10 may obtain cutoff confirmation in S20 by outputting at least one of a normal traveling torque command value or a limp home torque command value, and a cutoff command.

The specific examples of the technology disclosed in the present specification have been described so far, but they are merely examples and do not limit the claims. The technology recited in the claims includes a variety of modifications or alternations of the specific examples. The technical advantages are brought by the technical elements described in the present specification or in the drawings alone or various combinations of the technical elements. They are not limited to the combinations recited in the claims as filed. In addition, the technology exemplified in the present specification or the drawings may achieve a plurality of objects at the same time. Achieving one of the objects itself brings a technical advantage.

What is claimed is:

1. A control system for an electrified vehicle, the control system comprising:

an electric power control device that adjusts electric power to be supplied to a motor of the electrified vehicle;

a first control device that outputs a first command value indicating a target output of the motor; and a second control device configured to be communicable with the first control device, the second control device outputting a driving signal to the electric power control device based on the first command value output from the first control device, wherein the second control device includes a processor configured to be communicable with the first control device, the processor programmatically processing the first command value output from the first control device, the processor outputting an operation command value for the motor, and a logic circuit including a first circuit structure that converts the operation command value output from the processor to the driving signal, in a case where a limp home mode that causes the electrified vehicle to limp home is executed, the first control device outputs a second command value based on the limp home mode to the logic circuit instead of the first command value, and the logic circuit further includes a second circuit structure that converts the second command value output from the first control device to a limp home driving signal, a third circuit structure that receives the driving signal resulting from the conversion by the first circuit structure and the limp home driving signal resulting from the conversion by the second circuit structure, and alternatively outputs one of the driving signals, and a fourth circuit structure that receives the output made by the third circuit structure and a cutoff command for the electric power control device, and cuts off the output made by the third circuit structure while receiving the cutoff command.

2. The control system according to claim 1, wherein the cutoff command is output from the first control device to the logic circuit.

3. The control system according to claim 1, wherein, in a case where the electrified vehicle is powered on, the first control device executes processing of confirming health of the fourth circuit structure by outputting the first command value or the second command value to the second control device and outputting the cutoff command to the logic circuit, and confirming that the output made by the third circuit structure is cut off.

4. The control system according to claim 1, wherein, in a case where the first control device detects a fault in the processor, the first control device executes the limp home mode.

5. The control system according to claim 1, wherein, in a case where the electrified vehicle is powered on and a fault in the processor is detected, the first control device executes processing of confirming health of the fourth circuit structure by outputting the second command value to the logic circuit and outputting the cutoff command to the logic circuit, and confirming that the output made by the third circuit structure is cut off.

* * * * *